(12) United States Patent
Yousef

(10) Patent No.: US 7,707,611 B2
(45) Date of Patent: Apr. 27, 2010

(54) RECEIVER WITH A VISUAL PROGRAM GUIDE FOR MOBILE TELEVISION APPLICATIONS AND METHOD FOR CREATION

(75) Inventor: Nabil Yousef, Foothill Ranch, CA (US)

(73) Assignee: Newport Media, Inc., Lake Forest, CA (US)

( * ) Notice: Subject to any disclaimer, the term of this patent is extended or adjusted under 35 U.S.C. 154(b) by 289 days.

(21) Appl. No.: 11/459,366

(22) Filed: Jul. 24, 2006

(65) Prior Publication Data

US 2008/0022335 A1 Jan. 24, 2008

(51) Int. Cl.
*H04N 7/16* (2006.01)
(52) U.S. Cl. .......................... 725/62; 348/725
(58) Field of Classification Search .................. 725/62, 725/38, 86; 348/725
See application file for complete search history.

(56) References Cited

U.S. PATENT DOCUMENTS

| | | | | |
|---|---|---|---|---|
| 5,485,198 A * | 1/1996 | Kallstrom | .................... | 725/151 |
| 6,020,930 A * | 2/2000 | Legrand | ...................... | 725/41 |
| 6,041,433 A * | 3/2000 | Kamada | ..................... | 714/795 |
| 6,151,336 A * | 11/2000 | Cheng et al. | ................. | 370/535 |
| 6,501,961 B1 * | 12/2002 | Kirkpatrick | .............. | 455/553.1 |
| 6,912,251 B1 * | 6/2005 | Ward et al. | ................... | 375/240 |
| 7,386,870 B2 * | 6/2008 | Lu | ............... | 725/62 |
| 2002/0037045 A1 * | 3/2002 | Yamada | .................... | 375/240.2 |
| 2004/0150747 A1 | 8/2004 | Sita | | |
| 2004/0172658 A1 * | 9/2004 | Rakib et al. | ................. | 725/120 |
| 2004/0264580 A1 * | 12/2004 | Chiang Wei Yin et al. | ...................... | 375/240.25 |
| 2005/0171964 A1 * | 8/2005 | Kulas | ......................... | 707/100 |
| 2006/0007953 A1 | 1/2006 | Vesma et al. | | |
| 2006/0009258 A1 * | 1/2006 | Narita et al. | ............. | 455/556.1 |
| 2007/0019578 A1 * | 1/2007 | Meiri | ......................... | 370/311 |
| 2008/0134245 A1 * | 6/2008 | DaCosta | ...................... | 725/44 |

* cited by examiner

*Primary Examiner*—Brian T Pendleton
*Assistant Examiner*—Cai Chen
(74) *Attorney, Agent, or Firm*—Rahman LLC

(57) ABSTRACT

A method of creating a visual program guide for use on a TDM mobile TV receiver comprises receiving a RF signal associated with a TV channel; demodulating all of the received RF signals associated with the TV channels; decoding all of the demodulated received RF signals corresponding to all the TV channels simultaneously; and creating the visual program guide as a consolidated view of each of the decoded TV channels, wherein the simultaneous decoding of the demodulated received RF signals significantly reduces a power consumption level and a memory utilization level in the receiver.

8 Claims, 5 Drawing Sheets

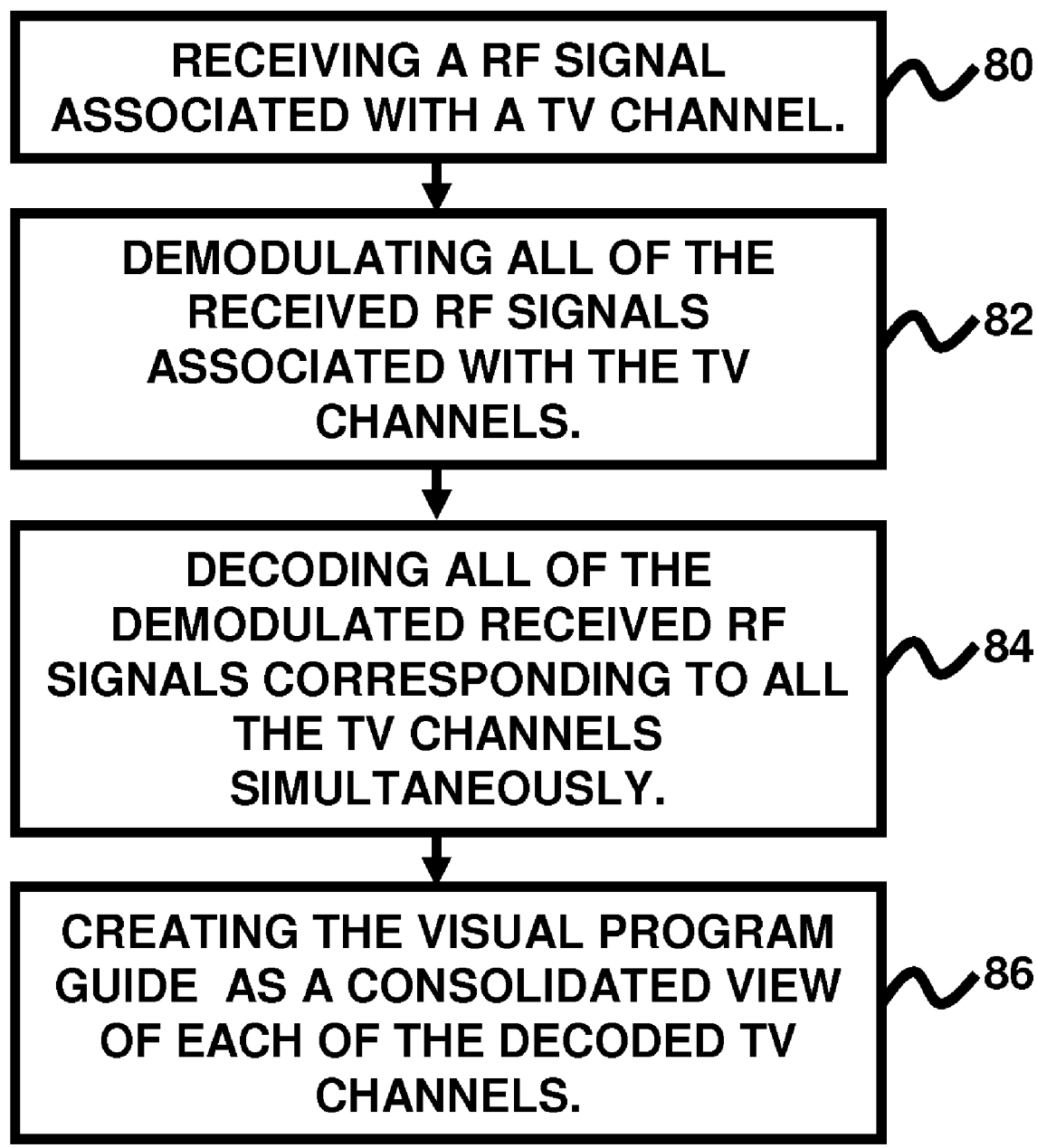

RECEIVER WITH A VISUAL PROGRAM GUIDE FOR MOBILE TELEVISION APPLICATIONS AND METHOD FOR CREATION

BACKGROUND

1. Technical Field

The embodiments herein generally relate to mobile television (TV) technologies, and, more particularly, to techniques for viewing and selecting mobile TV programs.

2. Description of the Related Art

Handheld devices with integrated digital television access are a relatively new phenomenon. Such technology has traditionally been limited by size, power consumption, and most importantly performance. Poor performance of such devices has typically been the result of the constantly changing receiver environment. More particularly, the quality of the received signal is affected by the device's ability to manage adjacent-channel rejection, low signal-to-noise ratios, and Doppler compensation, among other factors.

Digital Video Broadcasting—Handheld (DVB-H) is the specification for bringing broadcast services to handheld receivers, and was formally adopted as an ETSI (European Telecommunications Standards Institute) standard in November 2004. More specifically, DVB-H is a terrestrial digital TV standard that tends to consume less power than its predecessor, the DVB-T standard, and generally allows the receiver to move freely while receiving the signal transmission, thereby making it ideal for cellular phones and other mobile devices to receive digital TV broadcasting over the digiTV network, and hence without having to use cellular telephone networks.

In mobile TV DVB-H systems such as DVB-H (ETSI EN 301 192), one radio frequency (RF) channel is shared among many TV channels (TV programs). These TV channels are multiplexed either in the time domain or in the frequency domain. When the TV channels are multiplexed in the time domain, each channel is given full access to the whole RF channel bandwidth for a short period of time (burst duration). After that burst is transmitted, bursts for other channels occupy the RF channel and so on. This multiplexing process is called time division multiplexing (TDM). FIG. 1 shows an example of time division multiplexing of 15 TV channels on one RF channel. The TV channels are labeled 1, 2, 3, ..., 15. In FIG. 1, it is shown that each TV channel occupies the whole RF channel for 1/15 of the time. A receiver which is watching only one channel (for example, CH2) needs only to be active (ON) during the periods of CH2 bursts. In order to conserve battery consumption, such a receiver will shut off its circuits when CH2 bursts are not occupying the RF channel. It thus becomes in a SLEEP mode. This shows that TDM of channels can help reduce power consumption of a receiver watching a single channel.

On the other hand, this causes a problem when the user wants to switch to watch another TV program on the same RF channel. One example is shown in FIG. 1, if the user wishes to switch to CH3 (denoted by Channel UP in FIG. 1). The worst case occurs when the user issues a command to switch to CH3 right after the burst of CH3 ends. In this case, the receiver has to wait until the next burst that belongs to CH3 appears on the RF channel. This causes the user to wait for a given period of time denoted as the channel switching delay. Such a delay could be as long as 5 to 7 seconds in DVB-H systems. Such a channel switching delay could be rather annoying to the user, especially when the user is flipping through channels trying to check the content in all of the channels.

One way around this would be to create a visual program guide, which can display the content of multiple channels simultaneously. The user browses the content of all of the channels without the need to flip through all channels by switching from one channel to the other (i.e., by manually switching from one channel to the other). The user then decides on which channel to switch to. However, one of the problems with this approach is that the video decoder will be required to receive and decode many programs simultaneously. This adds significant complexity and power consumption to the video decoder being used. Furthermore, it requires the use of a very fast interface between the demodulator and video decoder which could be very costly in terms of power consumption.

Another scenario is that the demodulator senses that the user wishes to flip through the channels. The demodulator then decodes all channels and buffers a single burst of each channel. The demodulator forwards the requested channel burst when the user switches to this channel. However, one of the problems with this approach is that the demodulator has to store a significant amount of video which requires the use of a lot of memory. Accordingly, there remains a need for a technique capable of allowing a viewer to select mobile TV channels in a more user-friendly manner and which reduces batter power consumption.

SUMMARY

In view of the foregoing, an embodiment herein provides a TDM mobile TV receiver comprising an antenna adapted to receive a RF signal associated with a TV channel; a RF front end section operatively connected to the antenna; an analog-to-digital (A/D) converter operatively connected to the RF front end section; a demodulator operatively connected to the A/D converter, wherein the demodulator is adapted to extract all of the received RF signals associated with the TV channels; and a video decoder operatively connected to the demodulator, wherein the video decoder is adapted to decode all of the extracted received RF signals corresponding to all the TV channels simultaneously; scale each TV channel simultaneously; and create a visual program guide comprising a consolidated view of each of the scaled TV channels. The video decoder may operate in a contiguous mode of operation such that the all TV channels are decoded simultaneously and transferred to the video decoder from the demodulator. Moreover, the video decoder preferably comprises sufficient processing power to enable decoding of multiple TV channels simultaneously. Furthermore, the video decoder preferably comprises sufficient memory capabilities to enable decoding of multiple TV channels simultaneously.

Another embodiment provides a TDM mobile TV receiver comprising an antenna adapted to receive a RF signal associated with a TV channel; a RF front end section operatively connected to the antenna; an A/D converter operatively connected to the RF front end section; a demodulator operatively connected to the A/D converter, wherein the demodulator is adapted to extract all of the received RF signals associated with the TV channels; and a video decoder operatively connected to the demodulator, wherein the video decoder is adapted to parse video frames of each TV channel; lower a visual resolution level of the parsed video frames from the each TV channel according to an available processing power level associated with the video decoder; decode all of the received RF signals corresponding to the lower visual resolution level of the parsed video frames from the each TV channel simultaneously; and create a visual program guide comprising a consolidated view of the each TV channel at the lower visual resolution level. Preferably, the video decoder comprises sufficient processing power to enable decoding of multiple TV channels simultaneously at the lower visual resolution level. Additionally, the video decoder preferably comprises sufficient memory capabilities to enable decoding of multiple TV channels simultaneously. Furthermore, the video decoder may be adapted to lower a visual resolution level of all parsed video frames except for reference video frames from the each TV channel. Also, the lower visual resolution level preferably comprises a reference frame rate level.

Another embodiment provides a TDM mobile TV receiver comprising an antenna adapted to receive a RF signal associated with a TV channel; a RF front end section operatively connected to the antenna; an A/D converter operatively connected to the RF front end section; a demodulator operatively connected to the A/D converter, wherein the demodulator is adapted to extract all of the received RF signals associated with the TV channels, and wherein the demodulator comprises a video parsing block adapted to parse video frames of each TV channel; and lower a visual resolution level of the parsed video frames except for reference video frames from the each TV channel; and a video decoder operatively connected to the demodulator, wherein the video decoder is adapted to decode all of the received RF signals corresponding to the lower visual resolution level of the parsed video frames from the each TV channel; and create a visual program guide comprising a consolidated view of the each TV channel at the lower visual resolution level. The video decoder may be adapted to discard non-reference video frames from the each TV channel. Preferably, the video decoder comprises sufficient memory capabilities to hold the reference video frames of a given TV channel. Moreover, the demodulator may be adapted to transfer only the reference video frames to the video decoder, and the video decoder may be adapted to decode only the reference video frames. Furthermore, the transferring of the reference video frames from the demodulator to the video decoder preferably occurs sufficiently quickly to allow memory reuse at the demodulator. Also, the demodulator may comprise only enough memory to store the reference video frames of only one TV channel. Additionally, the video decoder may be adapted to implement a multiprotocol encapsulation forward error correction (MPE-FEC) operation, wherein a memory component of the MPE-FEC operation is adapted to store the reference video frames. Moreover, the video decoder may comprise only enough memory to store the reference video frames of all the TV channels.

Another embodiment provides a method of creating a visual program guide for use on a TDM mobile TV receiver, wherein the method comprises receiving a RF signal associated with a TV channel; demodulating all of the received RF signals associated with the TV channels; decoding all of the demodulated received RF signals corresponding to all the TV channels simultaneously; and creating the visual program guide as a consolidated view of each of the decoded TV channels, wherein the simultaneous decoding of the demodulated received RF signals significantly reduces a power consumption level and a memory utilization level in the receiver. The method may further comprise scaling each TV channel simultaneously. Moreover, the method may further comprise parsing video frames of each TV channel; lowering a visual resolution level of the parsed video frames from the each TV channel according to an available processing power level associated with the receiver; and decoding all of the demodulated RF signals corresponding to the lower visual resolution level of the parsed video frames from the each TV channel simultaneously. Additionally, the method may further comprise lowering a visual resolution level of all parsed video frames except for reference video frames from the each TV channel, wherein the lower visual resolution level may comprise a reference frame rate level. Also, the method may further comprise discarding non-reference video frames from each TV channel. Furthermore, the method may also comprise decoding all of the demodulated received RF signals corresponding to all the TV channels according to their time of arrival at the receiver.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 5 is a flow diagram illustrating a method according to an embodiment herein.

DETAILED DESCRIPTION OF PREFERRED EMBODIMENTS

Figure 1:
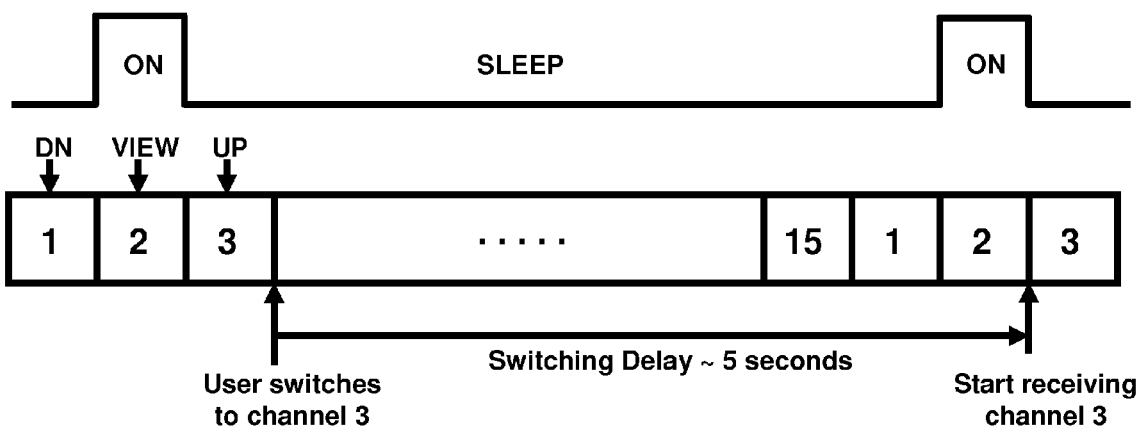
FIG. 1 is a schematic diagram illustrating channel switching delay in conventional TDM systems.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a technique capable of allowing a viewer to select mobile TV channels in a more user-friendly manner and which reduces batter power consumption. The embodiments herein achieve this by providing a visual program guide in TDM mobile TV systems such as DVB-H and MediaFlo™. Referring now to the drawings, and more particularly to FIGS. 2 through 5, where similar reference characters denote corresponding features consistently throughout the figures, there are shown preferred embodiments.

Figure 2:
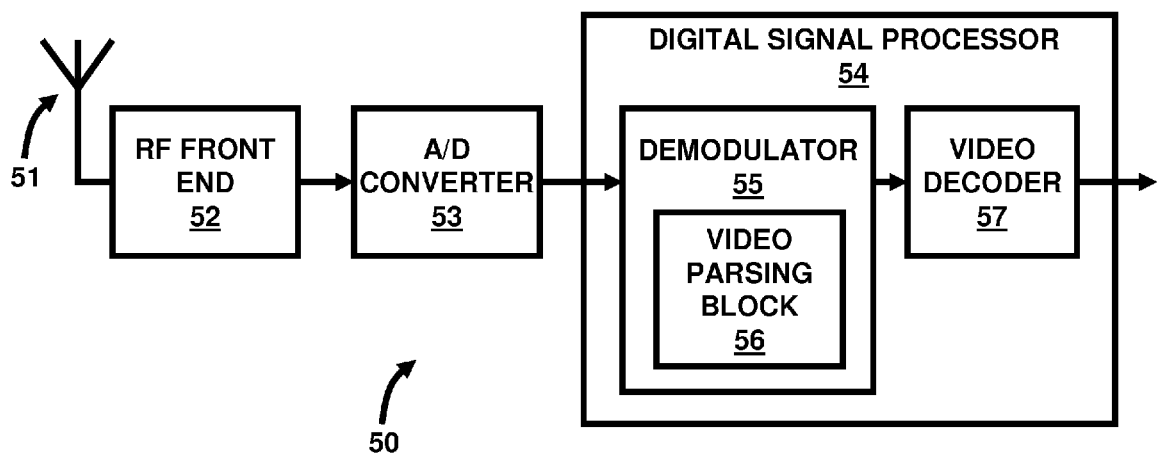
FIG. 2 is a schematic diagram illustrating a receiver according to an embodiment herein.

FIG. 2 illustrates a TDM mobile TV receiver 50 comprising an antenna 51 adapted to receive a RF signal associated with a TV channel; a RF front end section 52 operatively connected to the antenna 51; an A/D converter 53 operatively connected to the RF front end section 52; and a digital signal processor (DSP) 54 operatively connected to the A/D converter 53. Preferably, the DSP 54 comprises a demodulator 55 that is operatively connected to the A/D converter 55 and a video decoder 57 that is operatively connected to the demodulator 55. The demodulator 55 is adapted to extract all of the received RF signals associated with the TV channels and further comprises a video parsing block 56 that has video parsing capabilities that is able to extract the reference frames of the video only. The interface between the demodulator 55 and video decoder 57 is preferably faster than the input data rate (for example, 31 Mbps for DVB-H systems).

Figure 3:
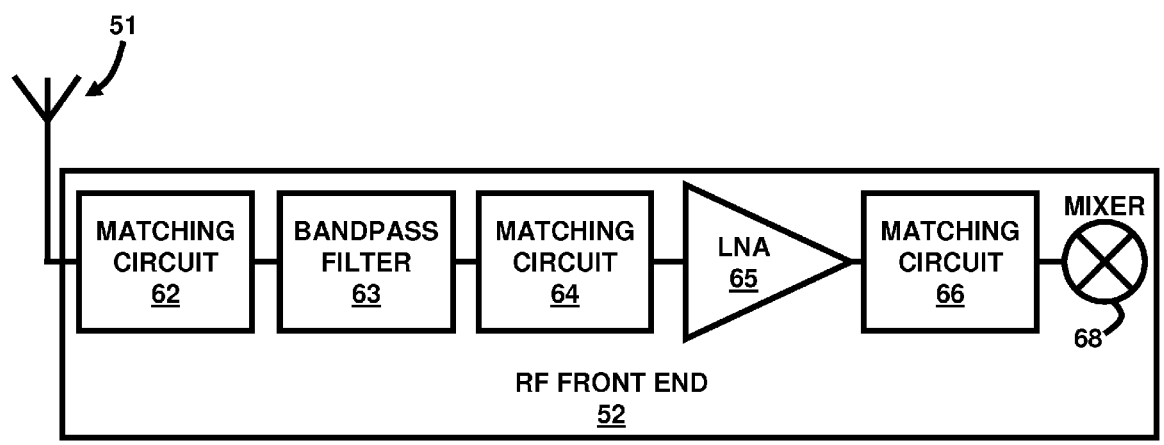
FIG. 3 is a schematic diagram illustrating a RF front end section of the receiver of FIG. 2 according to an embodiment herein.

As illustrated in FIG. 3, with reference to FIG. 2, the RF front end section 52 comprises a first matching circuit 62 adapted to allow all of the received energy from the antenna 51 to get to the DSP 54. The RF front end section 52 further includes a bandpass filter 63 operatively connected to the first matching circuit 62 and adapted to knock down out-of-band jammers; a second matching circuit 64 operatively connected to the bandpass filter 63; a low noise amplifier (LNA) 65 operatively connected to the second matching circuit 64 and adapted to set the sensitivity of the receiver 50 by offering high gain and a very low noise figure (NF); a third matching circuit 66 operatively connected to the output of the LNA 65; and a receiver mixer (downconverter) 68 operatively connected to the third matching circuit 66.

Figure 4:
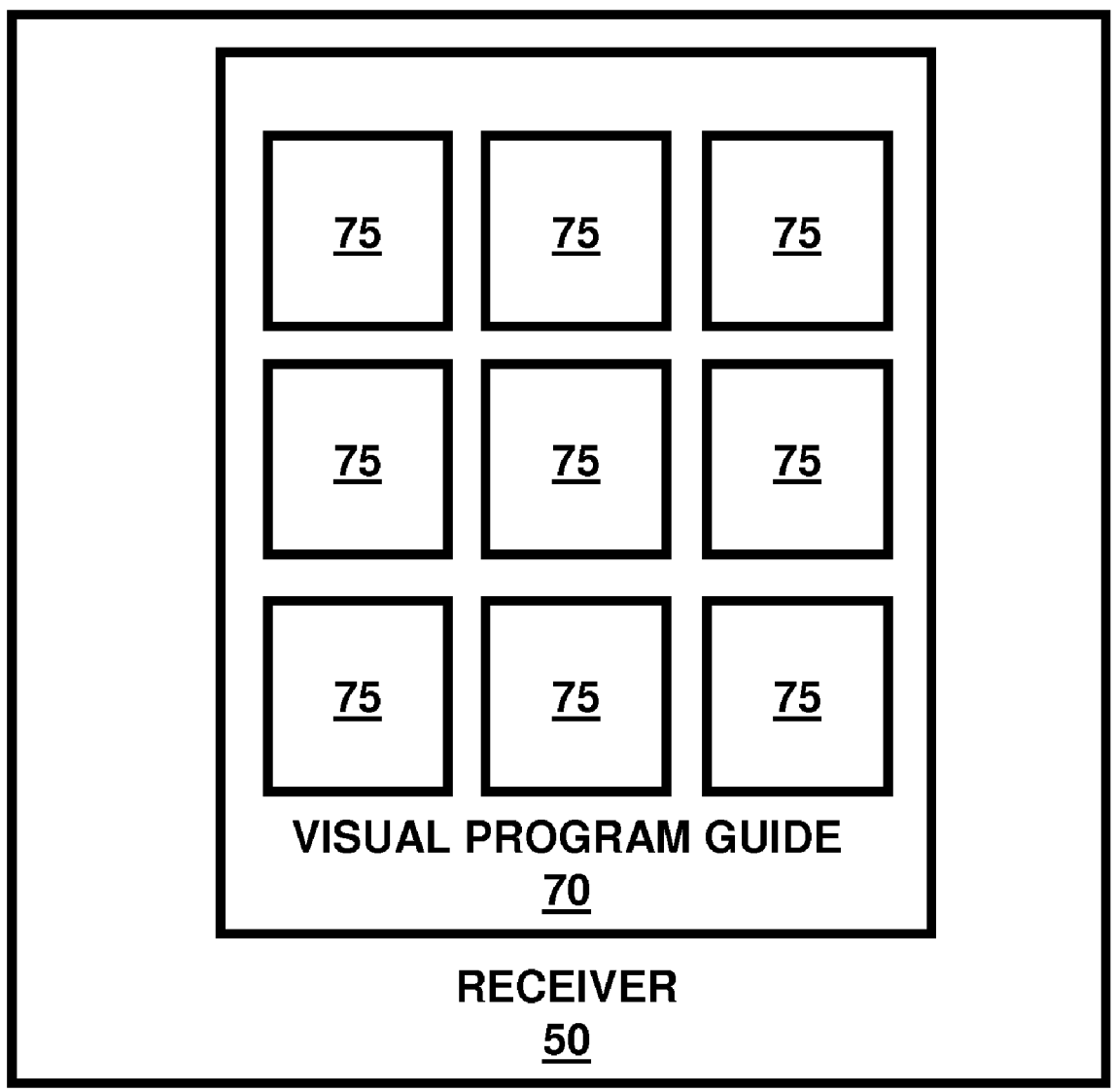
FIG. 4 is a schematic diagram illustrating a visual program guide presented on the receiver of FIG. 2 according to an embodiment herein.

With respect to FIGS. 2 and 4, in order to create a visual program guide 70, such as the one shown in FIG. 4, one or many of the following embodiments could be used. In a first embodiment, all channels 75 are decoded at the demodulator 55 and passing the decoded channels to the video decoder 57. The video decoder 57 works in a contiguous mode where all channels are decoded and transferred to the video decoder 57. In this embodiment, the video decoder 57 decodes and scales each video channel 75 and creates the visual program guide 70. Preferably, the video decoder 57 has enough processing power and memory to decode multiple channels 75 simultaneously. The processing power needed depends on many factors, such as the implementation of the video decoder 57 itself, the frame rate of the transmitted video, the video encoding profile of the transmitted video, etc. However, in one typical DVB-H RF channel, one could find approximately 15 TV programs or TV channels. Decoding all of them would require 15 times the processing power and 15 times the memory size needed to decode one channel.

In a second embodiment, the video decoder 57 parses the video of each channel 75 and drops frames of each channel 75 and displays each channel 75 at a lower resolution. The lower resolution depends on how many frames are being dropped. For example, if a typical video is being transmitted at a frame rate of 30 frames/second and the video decoder 57 drops 25 frames/second, then the resulting video resolution would be 5 frames/second. Specifically, the video decoder 57 parses the video of all channels 75 and drops frames of each channel 75 according to the available processing power, whereby each channel 75 is then decoded at a lower frame rate. The processing power needed depends on many factors, such as the implementation of the video decoder 57 itself, the frame rate of the transmitted video, the video encoding profile of the transmitted video, etc. For example, if a specific video decoder 57 decodes 1 TV channel at 30 frames/sec, decoding 15 channels at 5 frames/second would require 15 times 5/30~2.5 times the processing power and memory. In this embodiment the video decoder 57 has enough processing power and memory to decode multiple channels 75 simultaneously at the lower frame rate. For example, in one typical DVB-H RF channel, one could find approximately 15 TV programs or TV channels. Decoding all of them would require 15 times the processing power and 15 times the memory size needed to decode one channel.

In a third embodiment, the video decoder 57 parses the video of each channel 75 and drops all frames except the reference frames. Each channel 75 is then decoded at a lower frame rate which is the reference frame rate. Mobile digital TV video frame rates are usually around 20 to 30 frames/second. The reference frame rate is usually around 1 to 5 reference frames/second. The reference frames are much easier to decode as they do not refer to other frames and all information needed to decode them is self-contained. Thus, decoding reference frames do not require high processing power at the video decoder 57. Decoding a reference frame typically requires 20 to 30% (say 25%) of the processing power needed for a non-reference frame. Thus, compared to a specific decoder that decodes 1 TV channel at 30 frames/sec, decoding 15 channels at 5 reference frames/second would require 15 times 5/30 times 25/100~0.625 times the processing power.

In a fourth embodiment, the demodulator 55 parses the video of each channel 75 and drops all frames except the reference frames. The demodulator 55 parses the video of all channels 75 and drops all frames of each channel 75 except reference frames. In this embodiment, the demodulator 55 comprises a video parsing block 56 in order to parse the video of the channels 75. The video decoder 57 discards the non-reference frames and thus it only has to carry enough memory that can hold reference frames of a given channel 75. Storing a reference frame typically requires 5 times the memory needed for a non-reference frame. Thus, compared to a specific decoder that decodes 1 TV channel at 30 frames/sec, decoding 15 channels at 5 reference frames/second would require 15 times 5/30 times 5~12.5 times the memory. However, since no non-reference frames are decoded, the reference frames do not have to be kept in the memory after they are decoded. Thus, only one reference frame is stored for each channel. Thus, the memory required becomes 15 times 5/30 times 5/15~0.83 the memory requirement for a regular decoder.

In a fifth embodiment, the demodulator 55 transfers only the reference frames to the video decoder 57, which decodes only the reference frames of the video channels 75. The transfer of reference frames from the demodulator 55 to the video decoder 57 occurs quickly enough to allow memory reuse at the demodulator 55. The transfer rate is preferably quicker than the data rate coming into the demodulator 55. In DVB-H systems, the maximum transfer rate is 31 Mbps. Thus, the transfer rate is faster than 31 Mbps. In this embodiment, the demodulator 55 parses (using a video parsing block 56) the video of all channels 75 and drops all frames of each channel 75 except reference frames. In other words, the demodulator 55 drops all non-reference frames. Because the demodulator 55 transfers only reference frames to the video decoder 57, this saves a significant amount of power consumption that would have been ordinarily wasted in the transfer operation of the non-reference frames. Additionally, this embodiment also saves memory at the video decoder 57 that would have been ordinarily wasted storing non-reference frames.

Furthermore, in this embodiment, the transferring of reference frames from the demodulator 55 to the video decoder 57 is sufficiently quick enough to allow the memory of the demodulator 55 to be depleted before another channel 75 comes in. Thus, the demodulator 55 needs only enough memory to store reference frames of one channel 75. Approximately 60 to 100 Kbytes of memory for each reference frame is required in the demodulator 55. The memory of the MPE-FEC operation in DVB-H could be used to store reference frames in this embodiment. Thus, no additional memory is required at the demodulator 55. Additionally, the video decoder 57 has enough memory to store reference frames of all channels 75. For 15 channels, approximately 15 times 100 Kbyte~1500 KByte of memory in the video decoder 57 is necessary.

Preferably, in order to save power consumption, the visual program guide 70 is available for viewing on the receiver 50 at the time of start-up of the receiver 50 or upon user request. Also, in order to reduce the time needed to create the visual program guide 70 the channels 75 may be decoded according to their time of arrival at the receiver 50 until all channels 75 in the visual program guide 70 are filled.

FIG. 5, with reference to FIGS. 1 through 4, is a flow diagram illustrating a method of creating a visual program guide 70 for use on a TDM mobile TV receiver 50 according to an embodiment herein, wherein the method comprises receiving (80) a RF signal associated with a TV channel 75; demodulating (82) all of the received RF signals associated with the TV channels 75; decoding (84) all of the demodulated received RF signals corresponding to all the TV channels 75 simultaneously; and creating (86) the visual program guide 70 as a consolidated view of each of the decoded TV channels 75, wherein the simultaneous decoding of the demodulated received RF signals significantly reduces a power consumption level and a memory utilization level in the receiver 50.

The method may further comprise scaling each TV channel 75 simultaneously. Moreover, the method may further comprise parsing video frames (not shown) of each TV channel 75; lowering a visual resolution level of the parsed video frames from the each TV channel 75 according to an available processing power level associated with the receiver 50; and decoding all of the demodulated RF signals corresponding to the lower visual resolution level of the parsed video frames from the each TV channel 75 simultaneously. Additionally, the method may further comprise lowering a visual resolution level of all parsed video frames except for reference video frames (not shown) from the each TV channel 75, wherein the lower visual resolution level may comprise a reference frame rate level. Also, the method may further comprise discarding non-reference video frames (not shown) from each TV channel 75. Furthermore, the method may also comprise decoding all of the demodulated received RF signals corresponding to all the TV channels 75 according to their time of arrival at the receiver 50.

Generally, the embodiments herein provide a technique for creating a visual program guide 70 on a mobile TV handheld device such as a receiver 50. To create such a visual program guide 70, the mobile TV demodulator 55 decodes several TV channels 75 in parallel and parses the video content to extract reference video frames for each channel 75. The reference frames are stored at the demodulator 55 and updated periodically. Once the user asks to switch channels 75 or to create a visual program guide 70, the demodulator 55 sends the reference frames for multiple channels 75 to the video decoder 57 which decodes the frames, scales them, and creates a thumbnail visual program guide 70.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A time division multiplexing (TDM) mobile television (TV) receiver comprising:
    an antenna that receives radio frequency (RF) signals associated with TV channels;
    a RF front end section directly connected to said antenna;
    an analog-to-digital (A/D) converter directly connected to said RF front end section;
    a demodulator directly connected to said A/D converter, wherein said demodulator extracts all of the received RF signals associated with the TV channels; and
    a video decoder directly connected to said demodulator, wherein said video decoder parses video frames of each TV channel; lowers a visual resolution level of the parsed video frames from said each TV channel according to an available processing power level associated with said video decoder; decodes all of the received RF signals corresponding to the lower visual resolution level of said parsed video frames from said each TV channel simultaneously; and creates a visual program guide comprising a consolidated view of said each TV channel at said lower visual resolution level,
    wherein said video decoder comprises processing power that decodes multiple TV channels simultaneously at said lower visual resolution level,
    wherein said video decoder comprises memory capabilities that decodes multiple TV channels simultaneously, and
    wherein said video decoder lowers a visual resolution level of all parsed video frames except for reference video frames from said each TV channel.

2. The receiver of claim 1, wherein said lower visual resolution level comprises a reference frame rate level.

3. A time division multiplexing (TDM) mobile television (TV) receiver comprising:
    an antenna that receives radio frequency (RF) signals associated with TV channels;
    a RF front end section operatively connected to said antenna;
    an analog-to-digital (A/D) converter operatively connected to said RF front end section;
    a demodulator operatively connected to said A/D converter, wherein said demodulator extracts all of the received RF signals associated with the TV channels, and wherein said demodulator comprises a video parsing block that parses video frames of each TV channel; and lowers a visual resolution level of the parsed video frames except for reference video frames from said each TV channel; and
    a video decoder operatively connected to said demodulator, wherein said video decoder decodes all of the received RF signals corresponding to the lower visual resolution level of said parsed video frames from said each TV channel; and creates a visual program guide comprising a consolidated view of said each TV channel at said lower visual resolution level, wherein said video decoder discards non-reference video frames from said each TV channel, wherein said video decoder comprises memory that holds said reference video frames of a given TV channel, wherein said demodulator transfers only said reference video frames to said video decoder, and wherein said video decoder decodes only said reference video frames, and wherein a lower resolution is determined based on a number of frames that are being dropped.

4. The receiver of claim 3, wherein the transferring of said reference video frames from said demodulator to said video decoder allows for memory reuse at said demodulator.

5. The receiver of claim 4, wherein said demodulator comprises memory that stores said reference video frames of only one TV channel.

6. The receiver of claim 3, wherein said video decoder comprises memory that stores said reference video frames of all said TV channels.

7. A method of creating a visual program guide for use on a time division multiplexing (TDM) mobile television (TV) receiver, said method comprising:

receiving, in said receiver, radio frequency (RF) signals associated with TV channels;

demodulating, in said receiver, all of the received RF signals associated with the TV channels;

decoding, in said receiver, all of the demodulated received RF signals corresponding to all said TV channels simultaneously and according to their time of arrival at said receiver;

parsing, in said receiver, video frames of each TV channel;

lowering, in said receiver, a visual resolution level of the parsed video frames from said each TV channel according to an available processing power level associated with said receiver;

lowering, in said receiver, a visual resolution level of all parsed video frames except for reference video frames from said each TV channel;

decoding, in said receiver, all of said demodulated RF signals corresponding to the lower visual resolution level of said parsed video frames from said each TV channel simultaneously;

scaling, in said receiver, each said TV channel simultaneously;

discarding, in said receiver, non-reference video frames from said each TV channel; and creating, in said receiver, said visual program guide as a consolidated view of each of the decoded TV channels, wherein the simultaneous decoding of said demodulated received RF signals reduces a power consumption level and a memory utilization level in said receiver.

8. The method of claim 7, wherein said lower visual resolution level comprises a reference frame rate level.

* * * * *